United States Patent [19]
Kamishima

[11] Patent Number: 6,008,744
[45] Date of Patent: Dec. 28, 1999

[54] PROCESSING UNIT

[75] Inventor: Yoshiyuki Kamishima, Tokyo, Japan

[73] Assignee: NEC Corporation, Tokyo, Japan

[21] Appl. No.: 08/927,600

[22] Filed: Sep. 11, 1997

[30] Foreign Application Priority Data

Jun. 11, 1996 [JP] Japan ................................. 8-239625

[51] Int. Cl.⁶ .................................................. H03M 7/00
[52] U.S. Cl. ........................................... 341/58; 341/50
[58] Field of Search ................................. 341/50, 58, 59

[56] References Cited

U.S. PATENT DOCUMENTS

| | | | |
|---|---|---|---|
| 5,592,160 | 1/1997 | Bennett et al. | 341/58 |
| 5,608,397 | 3/1997 | Soljanin | 341/58 |
| 5,742,243 | 4/1998 | Moriyama | 341/59 |
| 5,754,587 | 5/1998 | Kawaguchi | 375/219 |

OTHER PUBLICATIONS

Draft Standard IEEE 802.11, "Wireless LAN", Jan. 25, 1996, IEEE, pp. 179–189.

Primary Examiner—Marc S. Hoff
Attorney, Agent, or Firm—Foley, Hoag & Eliot LLP

[57] ABSTRACT

The configuration of a whitener encoder used in a wireless LAN is simplified, thereby reducing the size of the circuit. The present weight of an n-bit interval is calculated by a counter that counts up when the transmitted data is "1", and counts down when it is "0". The weight for data already sent out is calculated by a counter that counts up when the transmitted data is "1", and counts down when it is "0". Whether or not the transmitted data is inverted is determined by comparing only the most significant bits, which are the sign bits of the counter, with a comparator circuit. A large circuit need not be used.

20 Claims, 18 Drawing Sheets

PROCESSING UNIT

BACKGROUND OF THE INVENTION

1. Field of the Invention

The present invention relates to a processing unit, and, more particularly, to a processing unit for a whitener encoder used for a wireless LAN.

2. Description of the Prior Art

A wireless LAN (local area network) is set forth in a standard being provided by the IEEE 802.11 Committee. An algorithm on the white encoder is described in a publication, "Wireless LAN Medium Access Control (MAC) and Physical Layer (PHY) Specifications," Draft Standard IEEE 802.11, Jan. 26, 1996 (P 802.1103), by Institute of Electrical and Electronics Engineers, Inc., pp. 179–180, 183–184, and 189.

First, a transmission frame used by the wireless LAN is described in FIG. 7. A start frame delimiter (SFD) 54 is sent following a preamble 53 in which "1" and "0" are repeated. After a header 55 containing information indicating transmission data length and a transmission frame is sent following SFD 54 informing a receiver that valid data follows, transmission data 56 is sent.

The transmission data 56 has a variable length. A whitener encoder inserts and sends one stuff bit 52 in every 32 bits. To suppress DC bias in a transmission frame, the whitener encoder inverts the transmission data 56 during certain 32 bits segments.

The stuff bit 52 is set to a "1" bit and inserted before the 32-bit interval in which the transmission data 56 is bit inverted. This enables the receiver to receive proper data by bit inverting the transmission data 56 again when the stuff bit 52 is a "1" bit. Here, a cyclic redundancy check (CRC) 57 for error checking is appended to the end of the transmission frame.

FIG. 8 is a block diagram showing the configuration of a conventional processing unit. The processing unit in the figure is configured according to the whitener encoder algorithm described in IEEE 802.11. The operation of a conventional processing unit is described below by referring to FIGS. 7 and 8.

First, the parallel format input transmission data is converted into a serial data format by a parallel-serial converter circuit 11. Then, the transmission data converted into the serial data format is randomized by a scrambler 12.

The scrambled data is input into an n-bit shift register 13. Here, n=32 is assumed. The shift register 13 takes out data from the transmission data 56 in the transmission frame in every 32 bits. Then, an adder circuit 31 weighs and adds the 32-bit data thus taken out by bit. This is to execute "bias_next_block=Sum {weight (b (0)), . . . , weight (b (32))}" in the above-mentioned algorithm of IEEE 802.11.

b(1) to b(32) indicate the data taken out by the 32-bit shift register 13. b(0) is the stuff bit 52. This stuff bit 52 is a bit inserted in a frame in every 32 bits by a stuff bit insertion circuit 14. The initial value of the stuff bit 52 is b (0)=0.

The weight is +2 when the transmission data 56 is "1," and –2 when it is "0". For example, weight (b (1))=+2 for b (1)=1, while weight (b (1))=–2 for b (2)=0.

The adder circuit 31 is reset when the frame transmission is started, and also reset after calculation for every 32 bits. The resetting causes the adder circuit 31 to have a value of "0".

Here, it is assumed that the result calculated by the adder circuit 31 is "bias," and the result calculated by the adder circuit 32 is "accum." Then, a comparator circuit 33 determines whether or not bias*accum>0. This means to execute "If {[accum*bias_next_block>0] then . . . }" in the algorithm. The comparator circuit 33 has an output of "0" if the determination result is bias*accum>0, and an output of "1" if the determination result bias*accum<0.

When the output of the comparator circuit 33 is "0", bit inversion is performed by a bit inverter circuit 15 for the data in the interval of 32 bits used for the calculation of bias when each bit is sent out. This is to execute "Invert {b (0), . . . , b (N)}" in the algorithm. On the other hand, when the output of the comparator circuit 33 is "1", the bit inversion is not performed.

When the output of the comparator circuit 33 is "0", inversion is performed on the output of the adder circuit 31 (bias) by a sign inverter circuit 34. This is to execute "bias_next_block=–bias_next_block" in the above algorithm. On the other hand, when the output of the comparator circuit 33 is "1", the bit inversion is not performed.

As described above, the adder circuit 31 adds transmitted data in every certain interval of 32 bits, and the adder circuit 32 adds the results obtained by the adder circuit 31. The result from the adder circuit 32 is saved in a register 35. Then, the comparator circuit 33 compares the value of the adder circuit 31 with that of the register 35 in every interval of 32 bits. According to the result of the comparator circuit 33, the sign inverter circuit 34 operates to invert the sign of the result of the adder circuit 31, and the bit inverter circuit 15 to invert the transmitted data "1" and "0". The output of the bit inverter circuit 15 becomes transmitted data TX.

Operation of a conventional whitener encoder is described by referring to the timing charts of FIGS. 9 and 10, and the block diagram of FIG. 8. FIGS. 9 and 10 show an example where 89h ("h" indicating a hexadecimal number, the same applying to the following) as a header (section of intervals A1 and A2 of FIG. 9), data of 75h, E7h, and B6h are sequentially transmitted from the least significant bit (hereinafter called "LSB"), and 19h, 59h, 05h, 31h, 26h, B1h, 9Ah, and 4Ch are transmitted as the transmitted data after scrambling (section of B1, C1, B2 and C2 of FIGS. 9 and 10) from LSB. For example, when 19h is transmitted from LSB, it is transmitted as "10011000".

Although in FIGS. 9 and 10 data in the interval A1 are not depicted, it is the same as the data in the interval A2. Data in an interval B1 are shifted 32 bits by the 32-bit shift register 13, and transmitted as transmitted data in an interval B2. Similarly, data in an interval C1 is transmitted in an interval C2.

Such shifting by 32 bits occurs because transmission should be performed after determining whether data during an interval of 32 bits is bit inverted after calculating weight based on the data according to the weight calculation method, which is described later.

The adder circuit 31 adds data in the interval of 32 bits with weight. The weight is +2 when the data is "1", and –2 when it is "0". For example, when 19h described above is added with the weight, it is +2–2–2+2+2–2–2–2=–4.

In timing (1) of FIG. 9, since there are 19 "1" bits and 13 "0" bits in the interval A1, the adder circuit 31 provides a result of addition of (+2×19)+(–2×13)=+12. For the interval A1 or the header section, the result of the adder circuit 31 is accumulated in the register as it is.

In timing (2) of FIG. 9, the adder circuit 31 adds data in the interval B1 including the stuff bit SB. Here, since there are 12 "1" and 21 "0", the result is (+2×12)+(–2×21)=–18.

In addition, in this timing, the comparator circuit 33 compares the addition result of the adder circuit 31 with the value of the register 35. In this case, since the output of the adder circuit 31 multiplied by the output of the register 35 is less than zero, no signal for inverting the data is output to the sign inverting circuit 34 and the bit inverting circuit 15.

In FIG. 9, the output of the comparator circuit 31 is "1". In other words, since the data inversion is not performed, the output of the sign inverting circuit 34 is "−18", and the bits in the interval B1 is transmitted in the interval B2 as it is without bit inversion. The adder circuit 32 adds the output "−18" of the sign inverting circuit 34 and the output "+12" of the register 35, and obtains a value of −6. The addition result of the adder circuit 32 is accumulated in the register 35.

Similarly, in timing (3) of FIG. 10, the adder circuit 31 adds data in an interval C1 including the stuff bit. Here, since there are 14 "1" bits and 19 "0" bits, the result is (+2×14)+(−2×19)=−10. In addition, in this timing, the comparator circuit 33 compares the addition result of the adder circuit 31 with the value of the register 35. In this case, since there is provided a result of the output "−10" of the adder circuit 31 multiplied by the output "−6" of the register 35 is greater than zero, the comparator circuit 33 outputs a signal for inverting the data to the signal inverting circuit 34 and the bit inverting circuit 15.

In FIG. 10, the comparator circuit 33 has the output of "0". That is, since the data is inverted, the sign inverting circuit 34 has an output of +10, and transmitted data in the interval C2 is bit-inverted data in the interval C1. The adder circuit 32 adds the output "+10" of the sign inverting circuit 34 and the output "−6" of the register 35, and obtains a value of "+4". The result of the adder circuit 32 is accumulated in the register 35.

Since the stuff bit SB is "1" in an interval in which the transmitted data is bit inverted, the receiver checks to determine whether or not the stuff bit SB is "1", and, if so, inverts subsequent 32 bit data again, and returns them.

The effect of suppression of DC bias by the whitener encoder is described. For example, if the interval C2 is not inverted, the output value of the register 35 after the completion of the interval C2 becomes +12−18−10=−16, so that the transmitted data are shifted toward "0". Then, when the interval C2 is inverted, the value of the register becomes +12−18+10=+4 as described above. In this case, it is reversely shifted towards "1" but not significantly. Thus, the DC bias on the transmitted data can be suppressed by adjusting the number of "1" and "0" in the transmitted data.

As described above, the conventional unit comprises, in addition to a shift register and a stuff bit insertion circuit, two adder circuits for calculating weight, a sign inverting circuit for inverting the result of weight calculation, a register for holding the results of weight calculation in the past, and a comparator circuit for determining whether or not the transmitted data is inverted. Thus, one disadvantage is that the circuit configuration of the processing unit is large. The size of the circuit configuration is described in the following.

First, a description is given for the internal configuration of two adder circuits 31 and 32. An example of the configuration of the adder circuit 31 is shown in FIGS. 11–17. In these figures, similar components are designed by like references.

Input terminals are terminals d15–d28 shown in FIG. 11, terminals d0–d10 shown in FIG. 14, a terminal d29 shown in FIG. 16, and terminals d11–d14 and d31 shown in FIG. 17. In addition, output terminals designated by ">>" in these figures are assumed to be connected to the input terminals with the same references as the output terminals and designated by ">>."

Furthermore, a terminal SUM of FIG. 17 is a 6-bit bus type output terminal, and shown by a thick line for convenience. One bit of the 6-bit terminal SUM of FIG. 17 leads to the input of FIG. 17 from the output of FIG. 15.

The adder circuit 31 with such a configuration performs the operation described above. It will be obvious that an equivalent circuit may be configured by using various gates. The adder circuit 31, configured as shown in FIGS. 11–17, has about 330 gates.

An example of the configuration of the adder circuit 32 is shown in FIG. 18. The adder circuit 32 comprises two input terminals dina and dinb, and an output terminal dout. The input terminals dina and dinb are of a 6-bit bus type, while the output terminal dout is of a 7-bit bus type. All of them are indicated by thick lines for convenience. It is assumed that the most significant bit of seven bits of the output terminal dout is not used, and the remaining six bits are used. Here, the adder circuit 32 shown in the figure has about 39 gates.

The above-mentioned conventional processing unit comprises, in addition to these adder circuits 31 and 32, a register 35 and comparator circuit 33. The register has about 34 gates, while the comparator circuit 33 has about 60–70 gates.

Therefore, the conventional unit has as many as 330+39+34+60=463 gates in total for the adder circuits 31 and 32, the register 35 and the comparator circuit 33, and consequently the circuit is very large.

BRIEF SUMMARY OF THE INVENTION

The present invention solves the above problems of the prior art, and is intended to provide a processing unit with a simple circuit configuration and a small circuit scale.

According to a first aspect of the present invention, there is provided a processing circuit for monitoring sequentially input data by n bits (n being a positive integer), and inverting and outputting the n-bit data in a certain situation. The processing unit comprises first counting means for counting up with the m-th bit (m being any integer from 1 to n) if one of the bits is either one of "1" or "0", and counting down when one of the bits is the other, a second counting means with the k-th bit (k being any integer from 1 to j) in bits, which are input before the n-bit data are input, is either "1" or "0", and counting down when the bit is the other, and bit inverting means for inverting the value of each bit in the n-bit data when the signs of the count values in the first and second counting means match each other.

According to a second aspect of the present invention, in the processing circuit of the first aspect, the bit inverting means comprises a comparator circuit for comparing the signs of the count values in the first and second counting means with each other, and an inverting circuit for inverting the value of each bit in the n-bit data according to the result of the comparison by the comparator circuit.

According to a third aspect of the present invention, in the processing circuit of the second aspect, the inverting circuit inverts the value of each bit in the n-bit data when the result of comparison by the comparator circuit indicates a match, and does not invert the value of each bit in the n-bit data when the result of comparison by the comparator circuit indicates no match.

According to a fourth aspect of the present invention, in the processing circuit of the second aspect, the comparator circuit is an exclusive OR gate that receives bits of both signs of the count value in the first and second counting means as input, and supplies the value of an exclusive logical sum of these bit values to the inverting circuit.

According to a fifth aspect of the present invention, in the processing circuit of the second aspect, the comparator circuit comprises an AND gate that receives bits of both signs of the count value in the first and second counting means as input, and outputs the value of a logical product of these bit values, a first NOR gate that receives bits of both signs of the count value in the first and second counting means as input, and outputs an inverted value of the logical sum of these count values, and a second NOR gate that receives the output of the AND gate and the output of the first NOR gate as input, wherein the inverted value of the output of the second NOR gate to the inverting circuit is supplied to the inverting circuit.

According to a sixth aspect of the present invention, the processing circuit of the first aspect further comprises means for appending information indicating whether or not inversion is performed by the inverting circuit to the n-bit data, and sending it out.

According to a seventh aspect of the present invention, in the processing circuit of the first aspect, the sign of the count value is determined by the values of the most significant bits of the count values in the first and second counting values.

According to an eighth aspect of the present invention, in the processing circuit of the first aspect, the count value in the first counting means is reset by the n bits, the count value in the second counting means being reset by the j bits.

According to a ninth aspect of the present invention, in the processing circuit of the first aspect, the first and second counting means output n-1 as their count values when they are reset.

According to a tenth aspect of the present invention, in the processing circuit of the first aspect, the n-bit data represents one or more data groups contained in one frame, the j-bit data containing the data groups from the least significant bit of a header appended to the top of the data groups, and representing data of the number of counted bits.

DETAILED DESCRIPTION OF THE PREFERRED EMBODIMENTS

An embodiment of the present invention is described below with references to the drawings.

Figure 1:
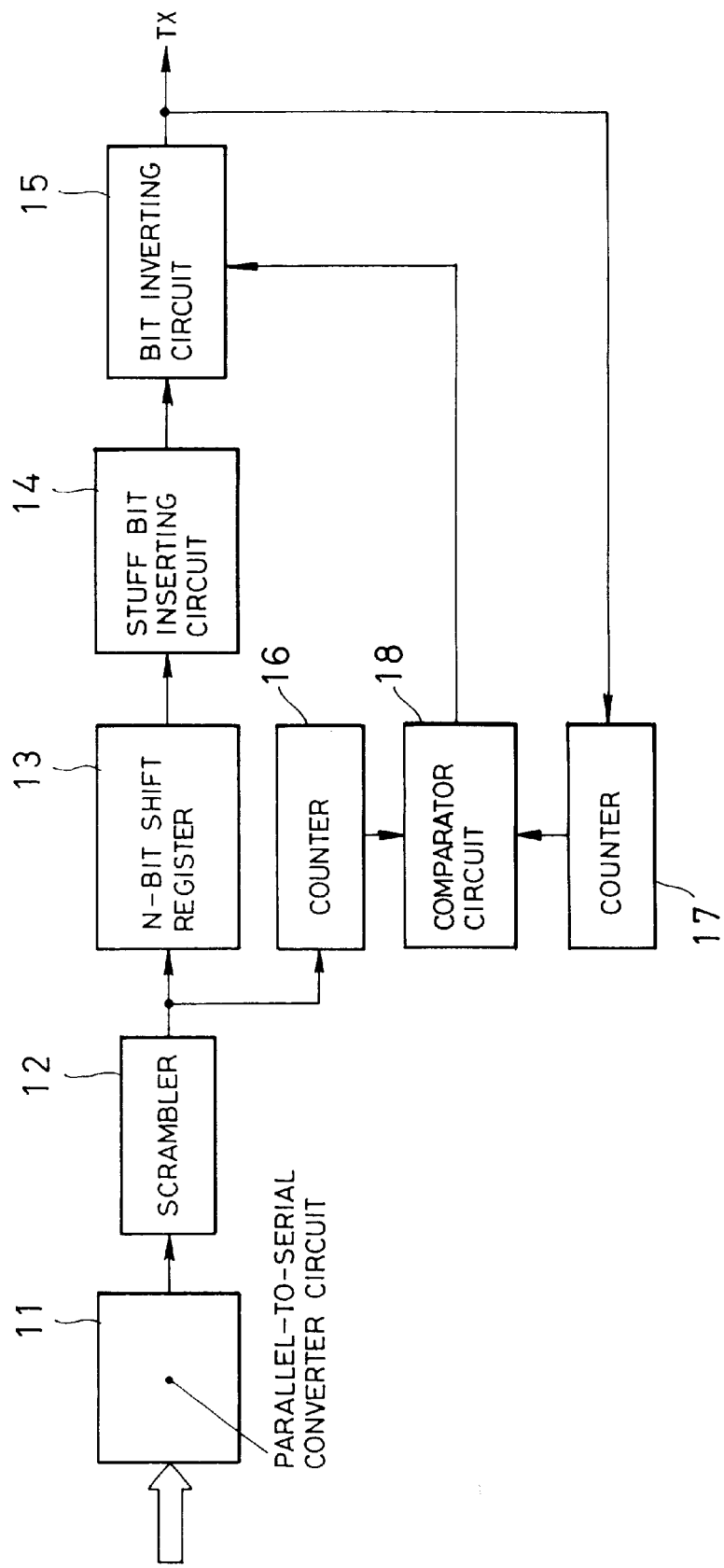
FIG. 1 is a block diagram showing a configuration of a processing unit according to an embodiment of the present invention.
Figure 8:
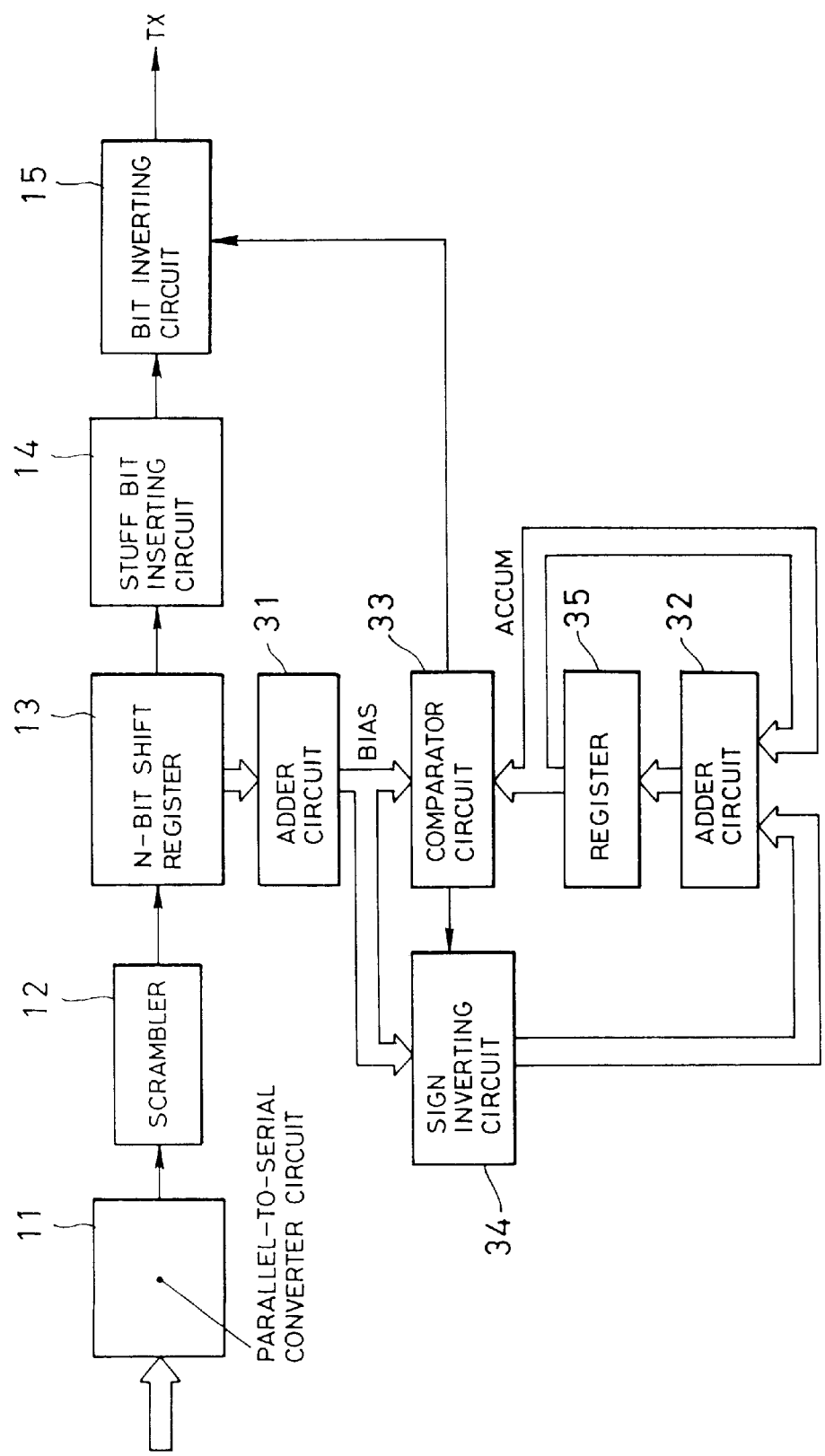
FIG. 8 is a block diagram showing of the configuration of a conventional processing unit.

FIG. 1 is a block diagram showing a configuration of a processing unit according to an embodiment of the present invention, in which components similar to those of FIG. 8 are designated by like references. This processing unit performing whitener encoding comprises a parallel-to-serial converter circuit 11 for converting transmitted data from parallel data to serial data, a scrambler 12 for randomizing the transmitted data, an n-bit shift register 13 for sequentially shifting and outputting the input data for n bits, a stuff bit insertion circuit 14 for inserting one bit in the transmitted data every n bits, and a bit inverting circuit 15 for inverting the transmitted data every one bit according to an instruction from the comparator circuit 18. Here, the unit is also described by assuming n=32.

In addition, the unit further comprises a counter 16 for counting up or down depending on whether the value of transmitted data TX in an n-bit interval being input data to the n-bit shift register 13, is "1" bit or "0" bit, a counter 17 for counting up or down depending on whether the transmitted data already sent out (the output of the bit inverting circuit 15) is "1" bit or "0" bit, and a comparator circuit 18 for determining whether or not the transmitted data is inverted.

The comparator circuit 18 outputs "0" bit when both input data are "1" bits or "0" bits, that is, when the input data match. In addition, the comparator circuit 18 outputs "1" bit when one of the input data is a "0" bit and the other one is a "1" bit, that is, when the input data do not match. The bit inverting circuit 15 inverts the transmitted data every one bit in the n-bit interval when the output from the comparator circuit 18 is a "0" bit, and does not invert the transmitted data when the output is a "1" bit.

The operation of the embodiment according to the present invention is described in FIG. 1. First, parallel format data to be transmitted is converted into a serial data format by the parallel-to-serial converter circuit 11. Then, the data converted into the serial data format is input into the scrambler 12, in which the transmitted data is randomized. The output of the scrambler 12 is input into the n-bit shift register 13.

The n-bit shift register 13 accumulates and delays the transmitted data for n bits before transmitting the data because whether or not the n-bit data is inverted is determined through calculation on the n-bit data. The output of the shift register 13 is input into the stuff bit insertion circuit 14.

The stuff bit insertion circuit 14 inserts one stuff bit into the data field in a transmitted frame every n bits. The output of the stuff bit insertion circuit 14 is input into the bit inverting circuit 15. The bit inverting circuit 15 inverts the transmitted data before transmission upon receipt of a signal from the comparator circuit 18, or, absent receipt of the signal, transmits the data without inversion.

Both the counters 16 and 17 are up/down counters. The scrambled transmitted data (the output of the scrambler 12) is input into the counter 16. Then, the counter 16 operates to count up for each "1" bit in the transmitted data and to count down for each "0" bit. Similarly, the counter 17 operates to count up if the data already transmitted (the output of the bit inverting circuit 15) is a "1" bit, and to count down if the already transmitted data is a "0" bit.

Here, it is assumed that the counter 16 is reset every 32 bits. On the other hand, the counter 17 is not reset until the transmission of one frame is complete. The counter 17 stores the data transmitted in the past.

As in the conventional unit, the transmitted data is inverted in the bit inverting circuit 15 to suppress DC bias of the transmitted data. However, different from the conventional unit, whether or not the data should be inverted in the comparator circuit 18 is determined by comparing the most significant bits of the counters 16 and 17 which are sign bits of the output of both counters, and, if the sign bits of both counters match, the bit inverting circuit is activated.

With such a configuration, the counter 16 is a 6-bit up/down counter that counts after every one bit of the transmitted data. The counter 16 counts up (+1) when the transmittal data is a "1" bit, and counts down (−1) when the transmitted data is a "0" bit. The initial value is 1Fh in hexadecimal (011111b in binary). In the description that follows, "b" represents a binary value. The most significant value is "1," which represents a positive value, while "0" represents a negative value.

Similarly, the counter 17 is also a 6-bit up/down counter that counts every bit of the transmitted data. The counter 17 counts up (+1) when the transmittal data is a "1" bit and counts down (−1) when the transmitted data is a "0" bit. The initial value is 1Fh (011111b). The most significant bit of the counter 17 is a sign bit. A "1" bit represents a positive value, while a "0" bit represents a negative value.

Figure 2:
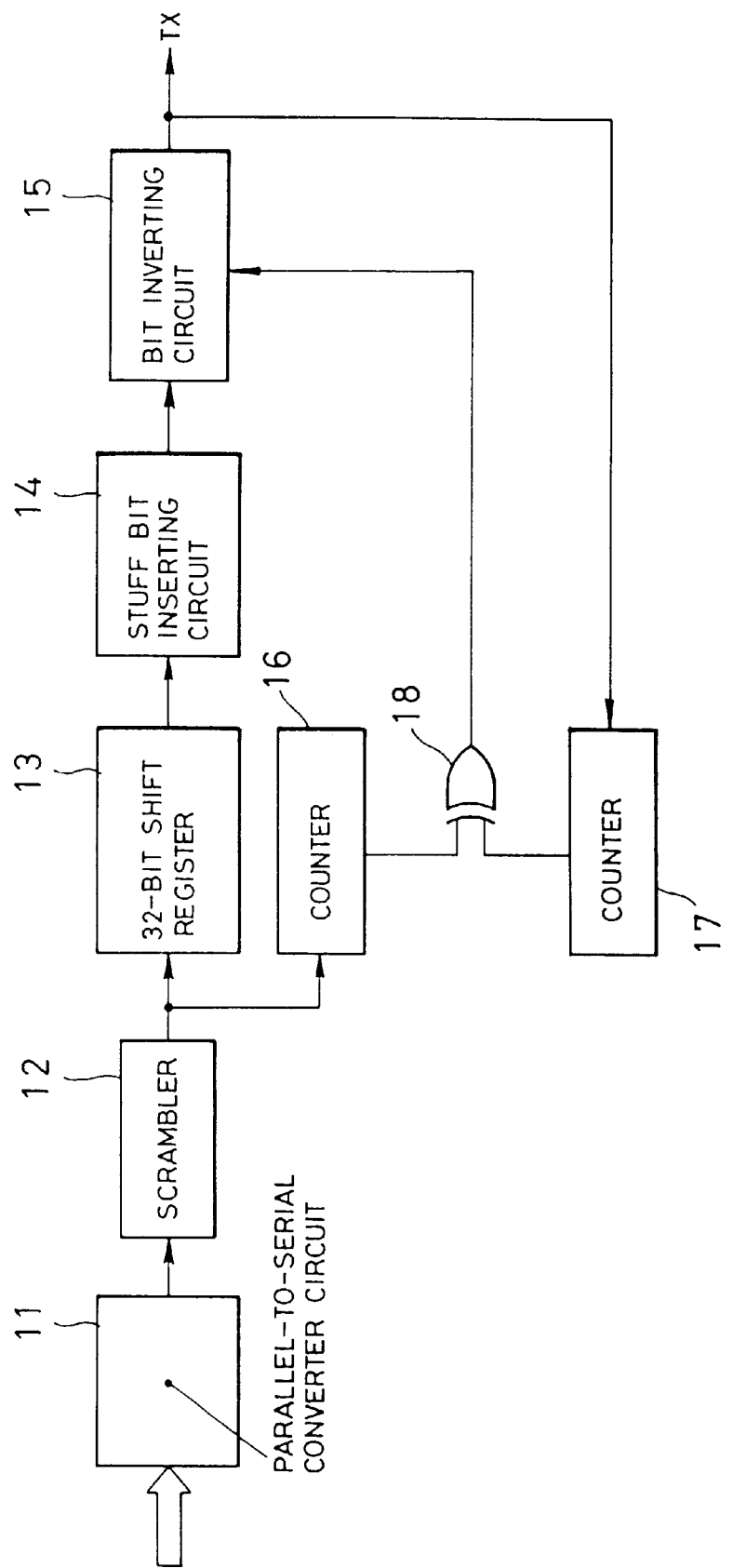
FIG. 2 is a block diagram showing a more detailed configuration of a processing unit of FIG. 1.

FIG. 2 shows a more detailed configuration of the processing unit of the present invention. As shown in FIG. 2, the comparator circuit 18 contains an exclusive OR gate (exclusive logical sum circuit). The comparator circuit 18 compares the most significant bits that are the sign bits of the counters 16 and 17.

When the comparison shows that both of the most significant bits are "0" or "1", or when (sign of counter 16)*(sign of counter 17)>0(the signs match), the comparator circuit 18 outputs "0" bit. When the output of the comparator circuit 18 is a "0" bit, the bit inverting circuit 15 inverts the transmitted data.

In contrast, when one of the most significant bits of both counters is a "0" bit and the other is a "1" bit, or when (sign of counter 16)*(sign of counter 17)<0(signs not matching), the comparator circuit 18 outputs a "1" bit.

The n-bit shift register 13 is a 32-bit shift register in this example. Accordingly, in every interval of 32 bits, one stuff bit is inserted into the transmitted data by the stuff bit inserting circuit 14, and a comparison is made by the comparator circuit 18.

Figure 3:
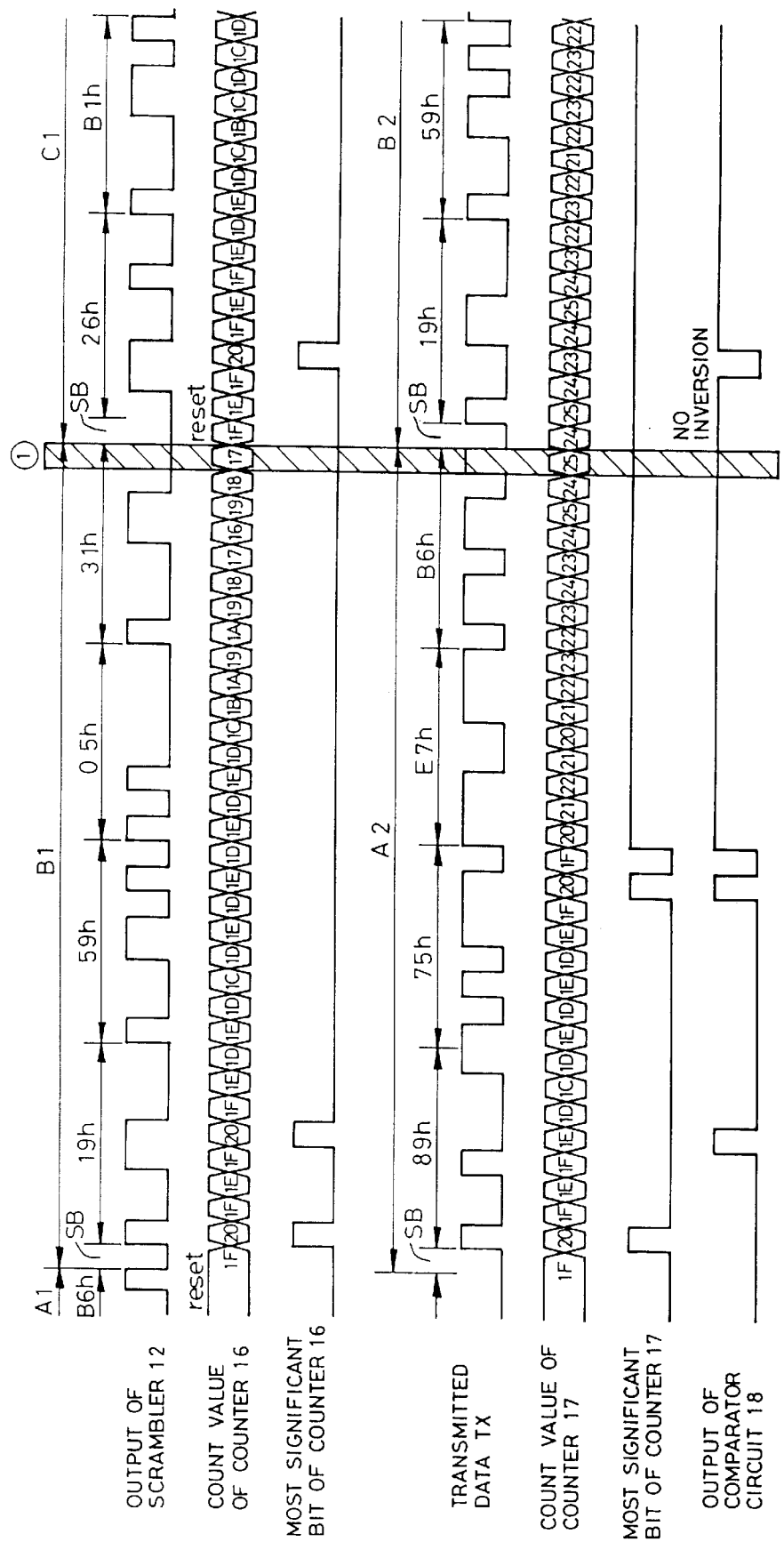
FIG. 3 is a part of a time chart showing the operation of the processing unit of FIG. 2.
Figure 4:
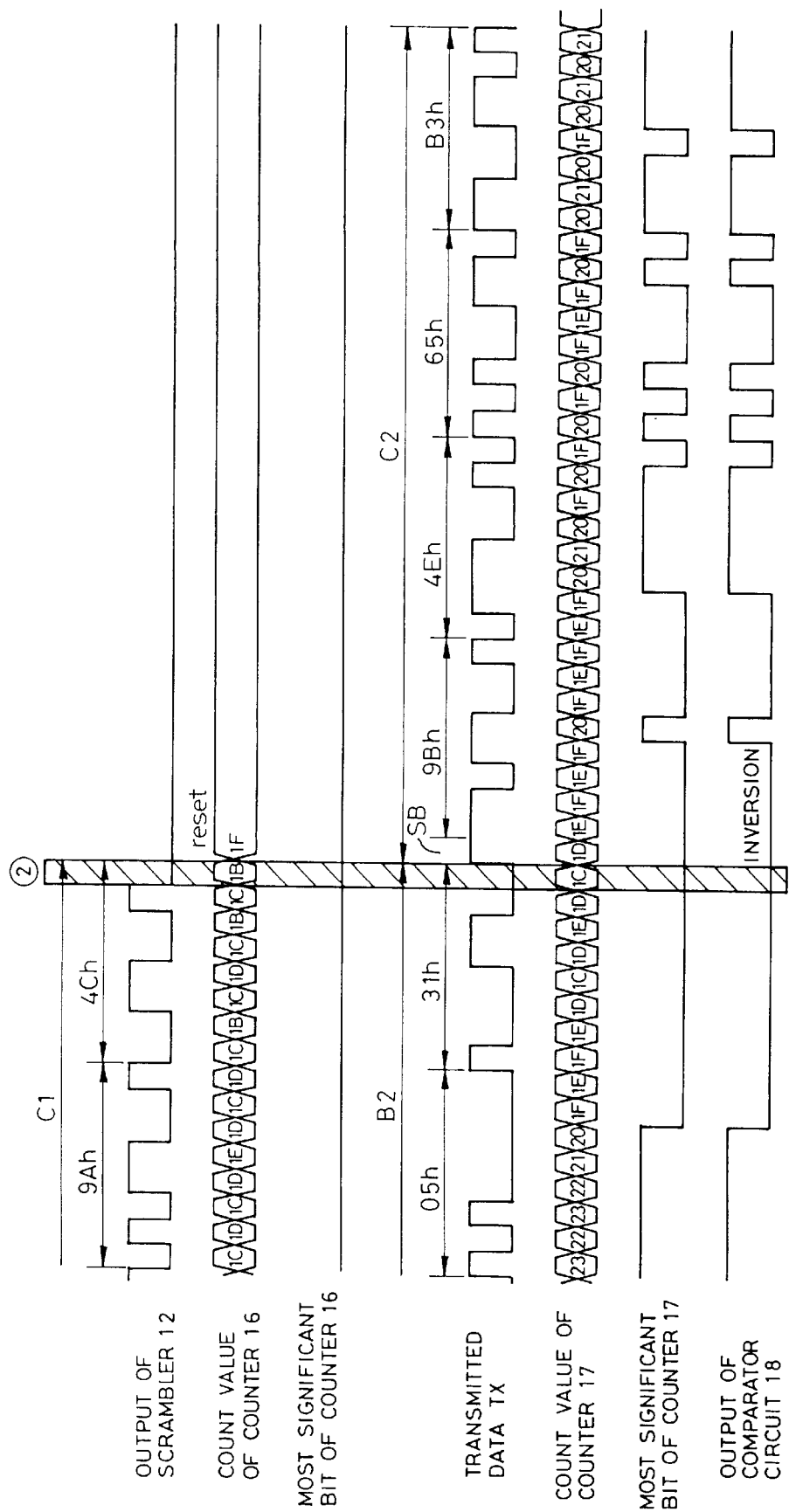
FIG. 4 is a part of a time chart showing the operation of the processing unit of FIG. 2.
Figure 9:
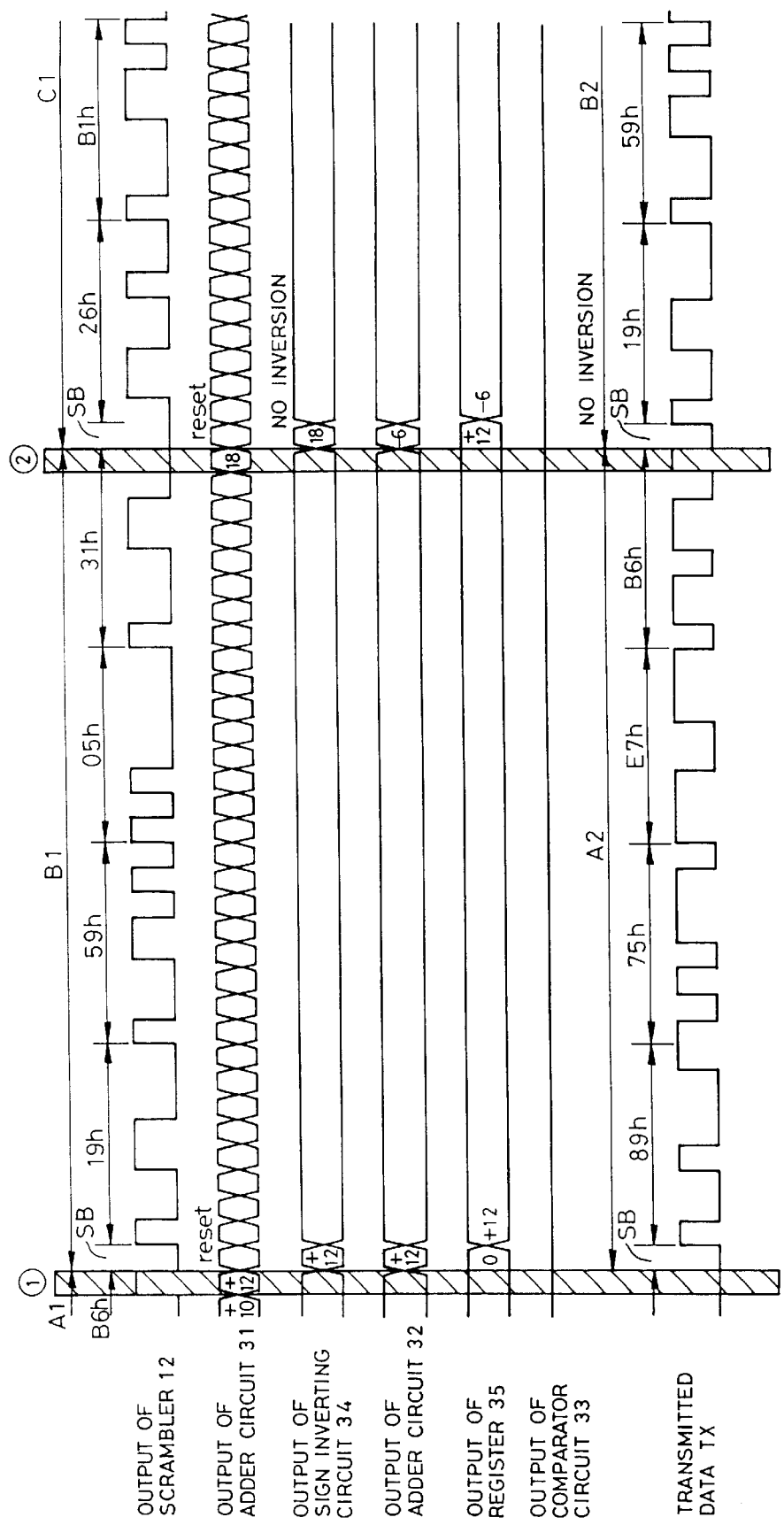
FIG. 9 is a part of a time chart showing the operation of the processing unit of FIG. 8.
Figure 10:
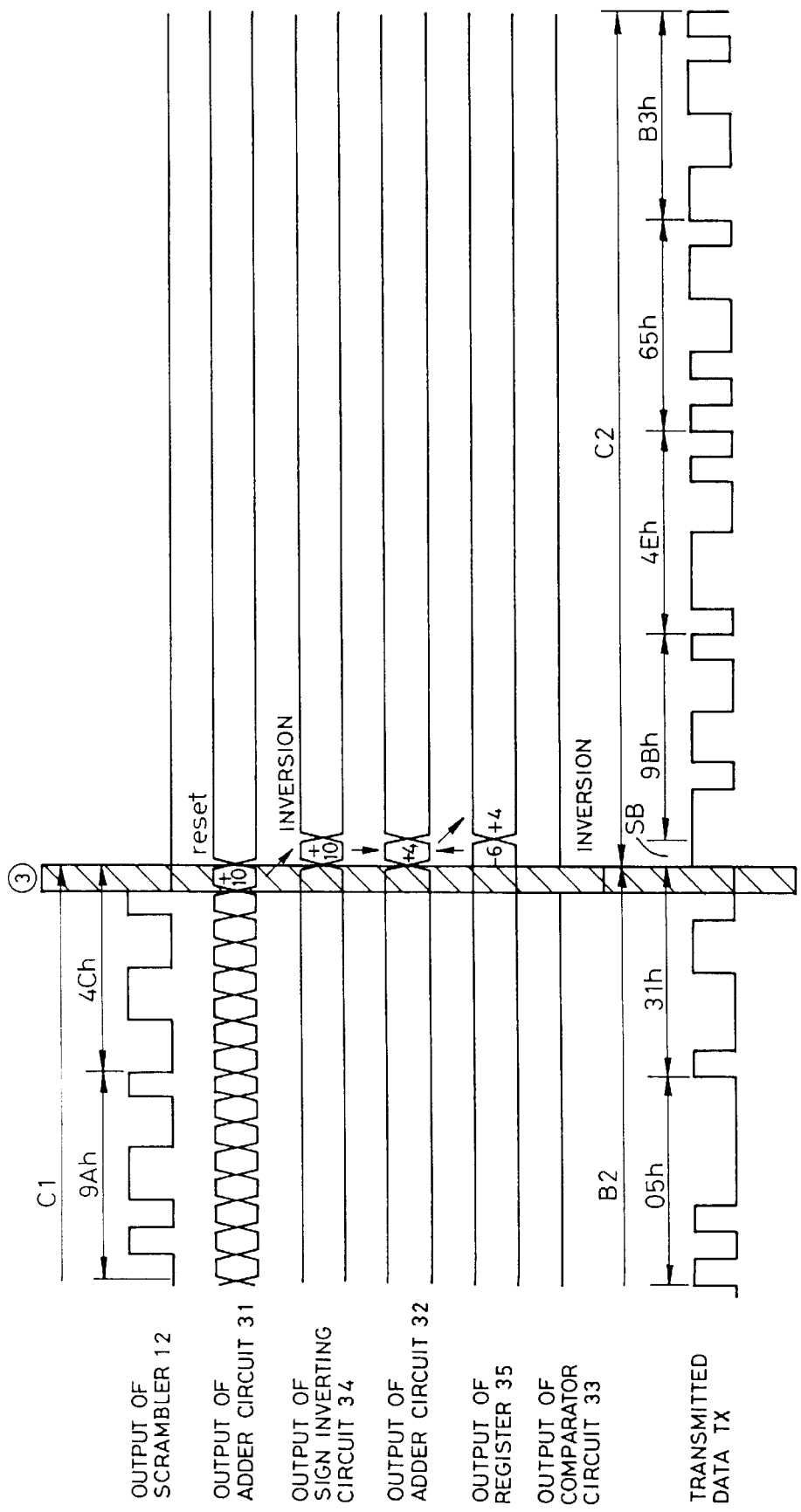
FIG. 10 is a part of a time chart showing the operation of the processing unit of FIG. 8.
Figure 11:
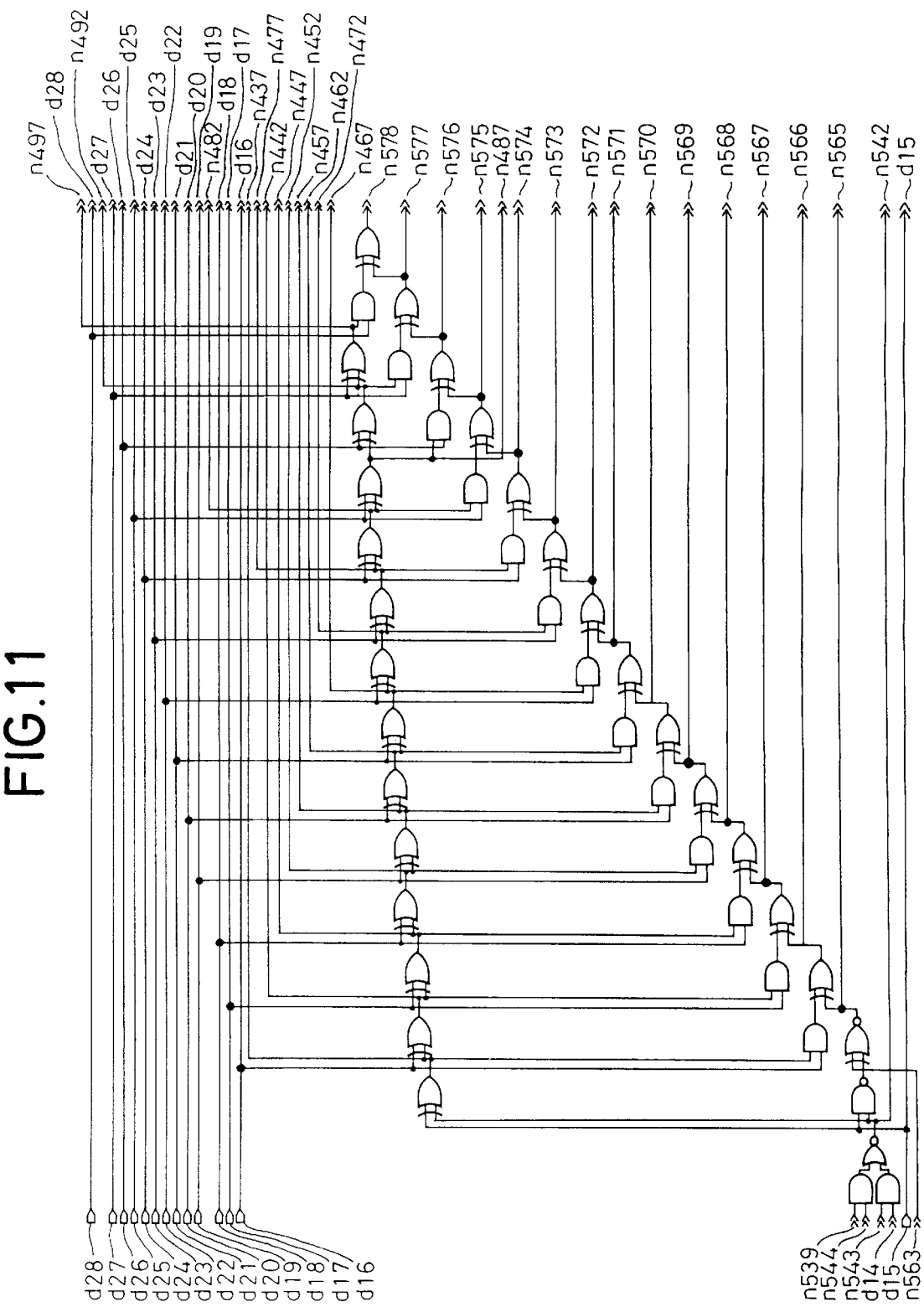
FIG. 11 is a block diagram showing a part of an internal configuration of an adder circuit 31 in FIG. 8.
Figure 12:
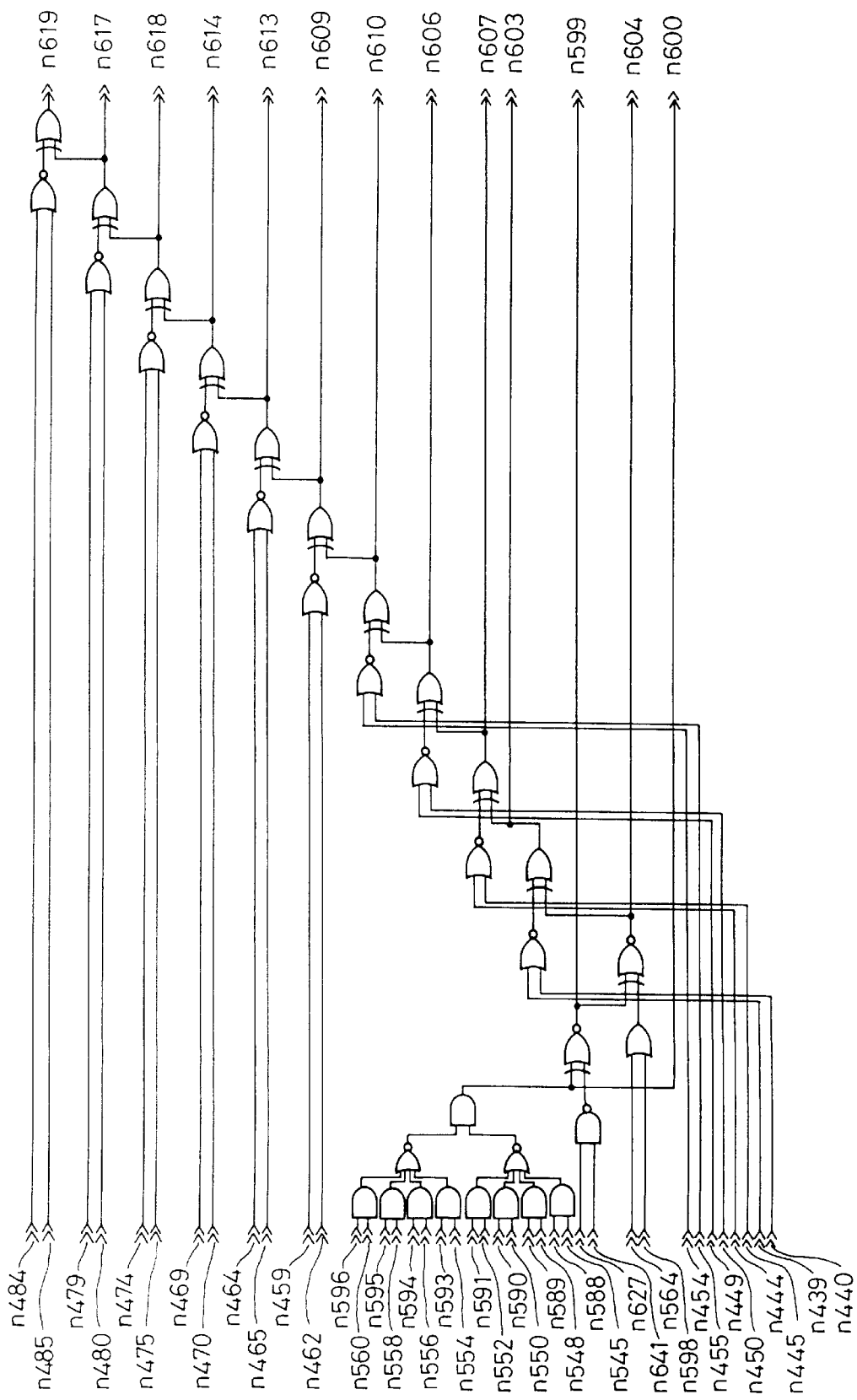
FIG. 12 is a block diagram showing a part of an internal configuration of an adder circuit 31 in FIG. 8.
Figure 13:
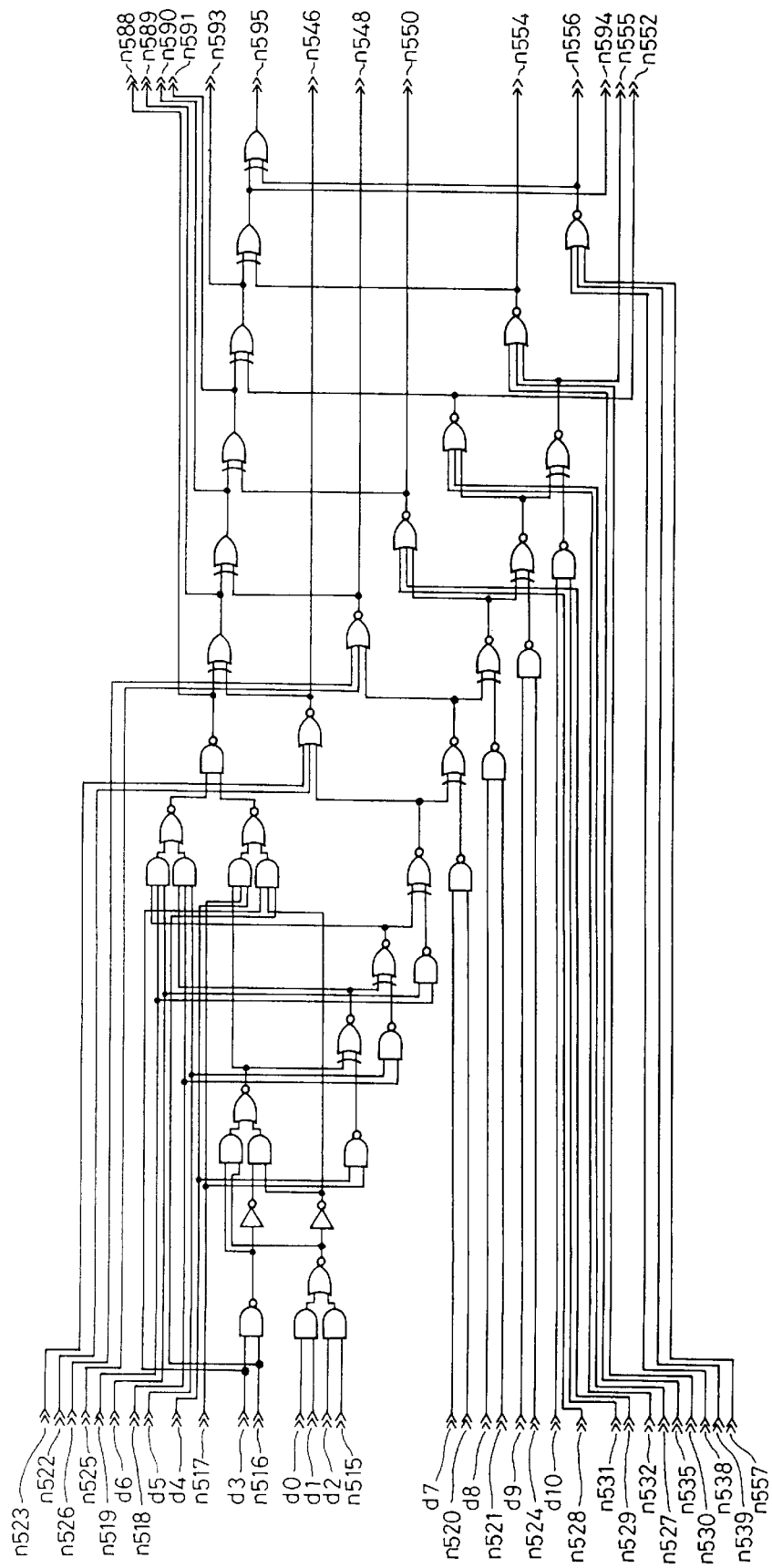
FIG. 13 is a block diagram showing a part of an internal configuration of an adder circuit 31 in FIG. 8.
Figure 14:
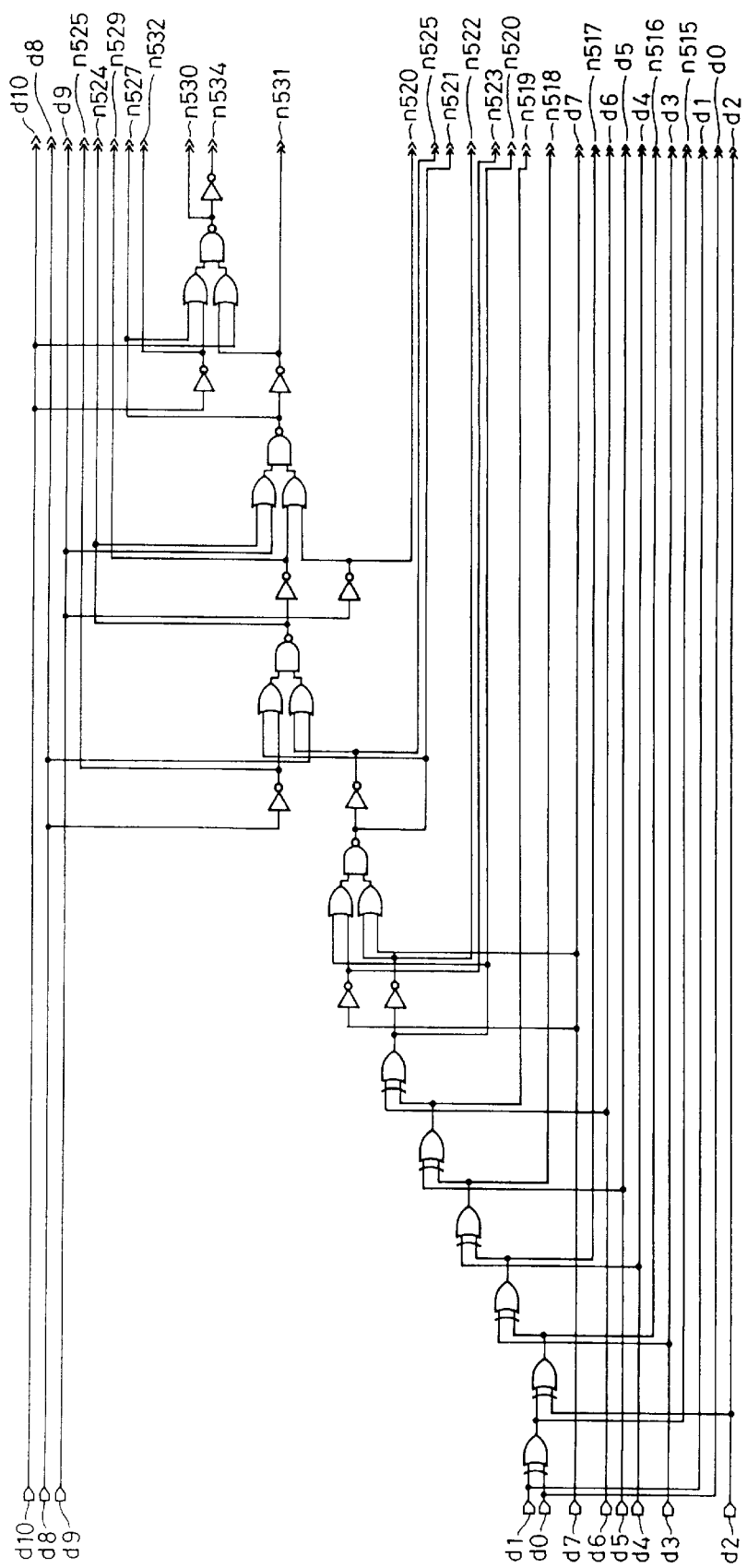
FIG. 14 is a block diagram showing a part of an internal configuration of an adder circuit 31 in FIG. 8.
Figure 15:
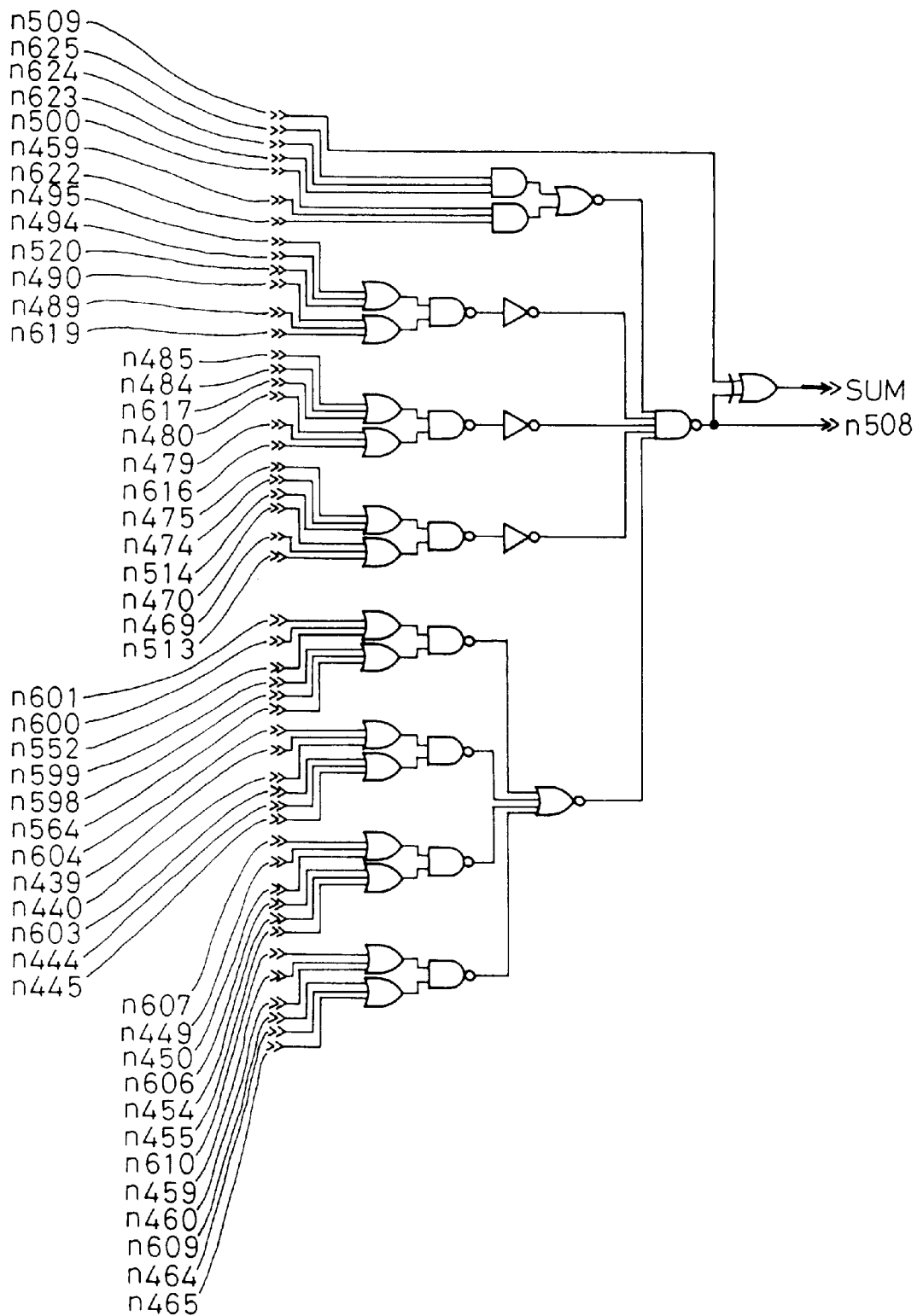
FIG. 15 is a block diagram showing a part of an internal configuration of an adder circuit 31 in FIG. 8.
Figure 16:
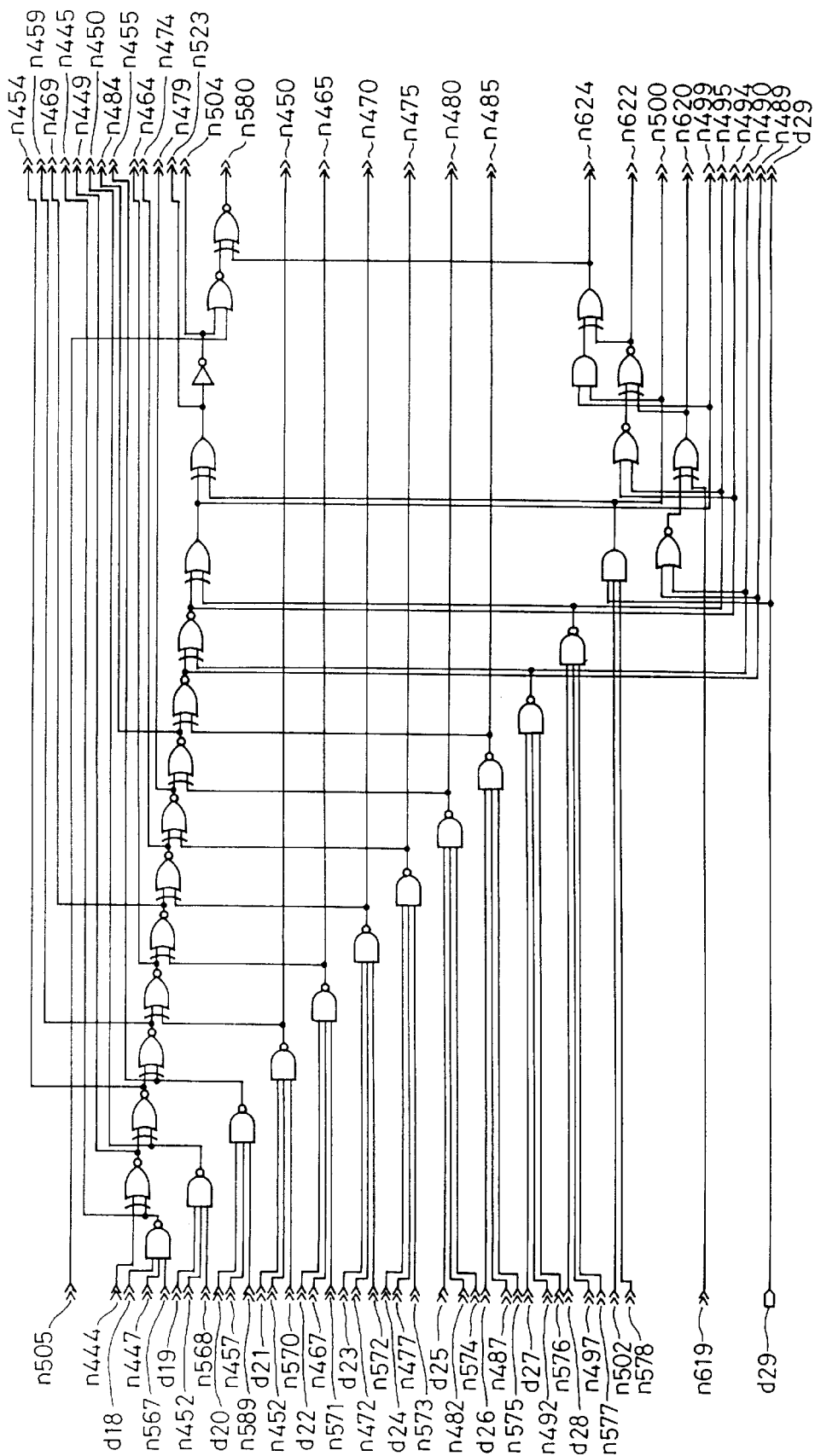
FIG. 16 is a block diagram showing a part of an internal configuration of an adder circuit 31 in FIG. 8.
Figure 17:
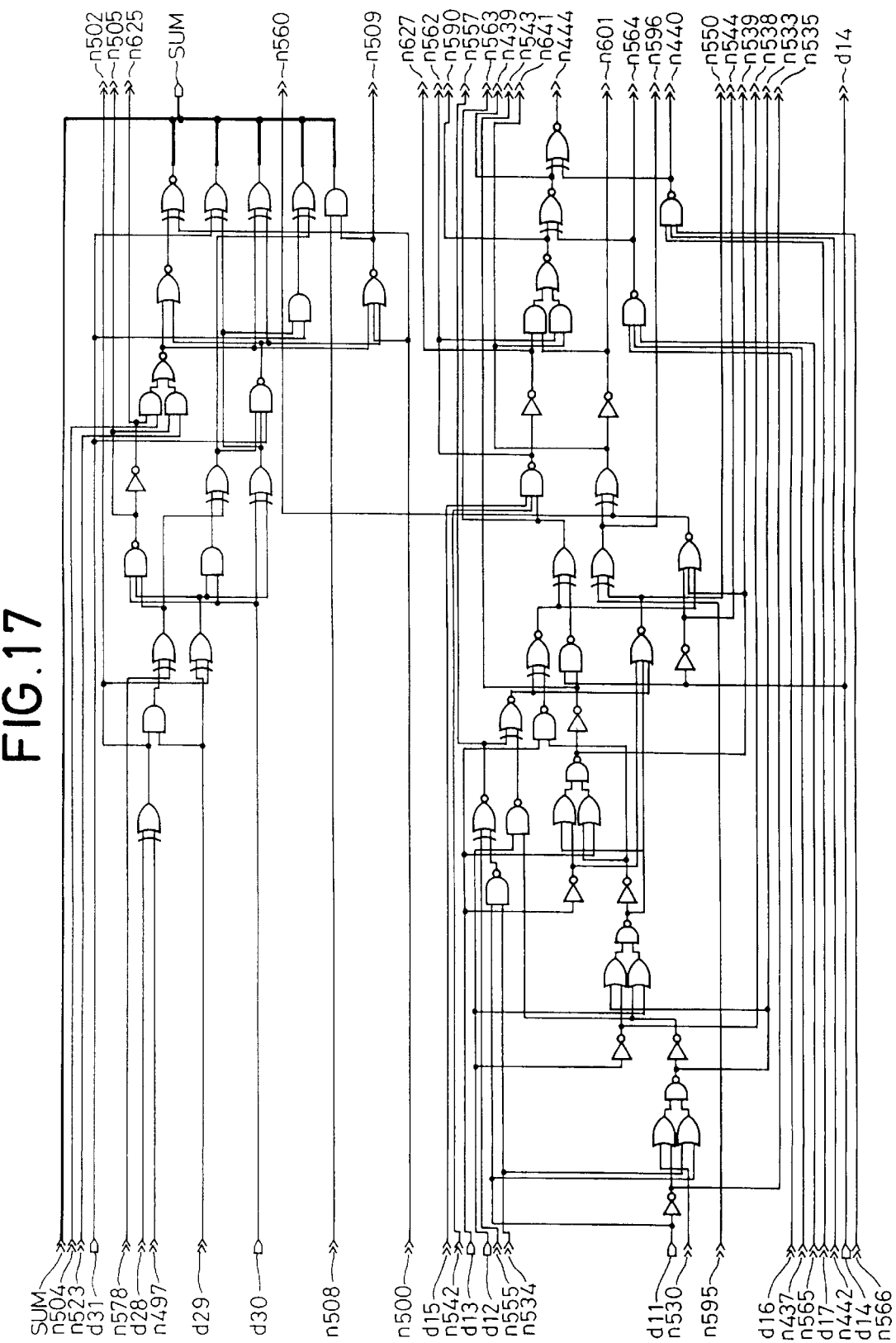
FIG. 17 is a block diagram showing a part of an internal configuration of an adder circuit 31 in FIG. 8.
Figure 18:
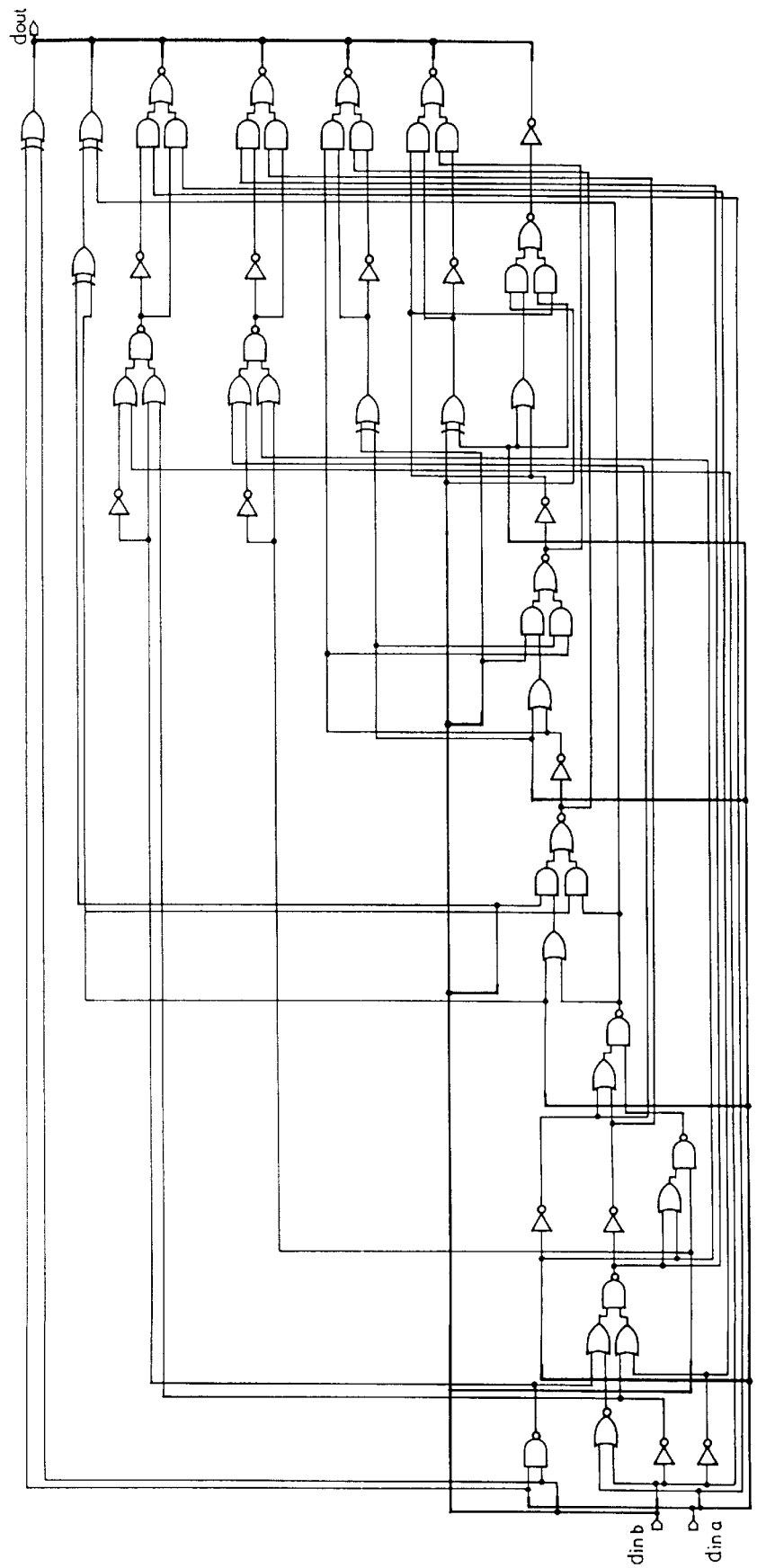
FIG. 18 is a block diagram showing a part of an internal configuration of an adder circuit 32 in FIG. 8.

FIGS. 3 and 4 are timing charts showing the operation of the processing unit. Components similar to FIGS. 9 and 10 are designated by like references. The operation of the embodiment according to the present invention is described by referring to the timing charts of FIGS. 3 and 4, as well as the block diagram of FIG. 1.

FIGS. 3 and 4 show an example where data of 89h, 75h, E7h, and B6h are sequentially transmitted from the least significant bit (LSB) as the header (section of intervals A1 and A2 in the figure), and 19h, 59h, 05h, 31h, 26h, B1h, 9Ah, and 4Ch are transmitted from LSB as the transmitted data after the scrambled section (section of intervals B1, C1 and C2). For example, when 19h is transmitted from LSB, it is transmitted as "10011000". Although FIG. 3 does not show data in the interval A1, it is the same as the data in the interval A2.

Data in the interval B1 is shifted by 32 bits by the 32-bit shift register, and transmitted as the transmitted data to the interval B2. Similarly, data in the interval C1 is transmitted to the interval C2. Shifting is performed by 32 because transmission may be performed by calculating weight according to a weight calculation method described later based on the data in a 32-bit interval, and then by determining whether or not the data is inverted.

The counter 16 counts data in a 32-bit interval. When the transmitted data is a "1" bit, the counter 16 counts up and is incremented by one. When the data is a "0" bit, the counter 16 counts down and is decremented by one. The counter 16 may be a 6-bit counter where five bits take into account a case where all "1" or "0" bits exists in the entire interval of 32 bits and the sixth bit is a sign bit. In addition, the counter 16 has a value of 1Fh upon reset when the stuff bit is inserted in the transmitted data series. For example, when the counter 16 counts 19h after being reset, the value of the counter 16 varies 1Fh, 20h, 1Fh, . . . , 1Dh as shown in FIG. 3. The counter 16 performs the counting operation on the data before it is passed through the whitener encoder.

The counter 17 counts data after that in the header section. The counting method is similar to that of the counter 16, in which, when the data is a "1" bit, the counter 17 counts up and is incremented by one, while, when the data is a "0" bit, the counter 17 counts down and is decremented by one. The counter 17 may also be a 6-bit counter where five bits take into account a case where all "1" or "0" bits exists in the entire interval of 32 bits and the sixth bit is a sign bit. In addition, the counter 17 also has a value of 1Fh when it is reset prior to counting the data in the header section. The counter 17 is reset again upon complete transmission for one frame. The counter 17 performs the counting operation on the data after the bit inversion after the DC bias is suppressed.

At the timing (1) of FIG. 3, the counter 16 counts data in the interval B1 including the stuff bit. The counter 16 is reset at the time of the stuff bit, and initialized to 1Fh. Thereafter, since the data is 10011000 . . . , the counter 16 varies as 20h, 1Fh, 1Eh, 1Fh, 20h, 1Fh, 1Eh, 1Dh . . . . Finally, a result of 17h is obtained at the timing (1).

In addition, the counter 17 counts data in the interval A2 in the header section. The counter 17 is reset, and has an initial value of 1Fh. Thereafter, since the data is 10010001 . . . , the counter 17 varies as 20h, 1Fh, 1Eh, 1Fh, 1Eh, 1Dh, 1Ch, 1Dh, . . . . Finally, a result of 25h is obtained at the timing (1).

At the timing (1), the most significant bit of the counter 16 is "0", and that of the counter 17 is "1". Then, the exclusive OR gate in the comparator circuit 18 takes an exclusive OR of these two most significant bits, and provides a result of "1".

When the output of the exclusive OR gate is "1" at the timing (1), no bit inversion is performed in transmitting data in the interval B1 or on data in the interval B2. This indicates that the data in the interval B1 contains a significant number of "0" bits, while the data in the interval A1 already transmitted has a significant number of "1" bits. Therefore, when the interval B2 follows the interval A2, if the data in the interval B1 is transmitted as it is without bit inversion, the numbers would be averaged for "1" and "0".

Similarly, at the timing (2) of FIG. 4, the counter 16 counts data in the interval C1 including stuff bit, and provides a result of 1Bh. In addition, the counter 17 counts data in the intervals A2 and B2, and provides a result of 1Ch. Here, it is found that, when the interval A2 is transmitted, it is biased toward "1", but it is biased toward "0" by transmitting the data in the interval B2 without inversion.

At the timing (2) of FIG. 4, the most significant bit of the counter 16 is a "0" bit, while that of the counter 17 is also a "0" bit. Thus, the exclusive OR gate in the comparator circuit 18 takes exclusive OR of these two most significant bits, and provides a result of "0".

When the output of the exclusive OR gate is "0" at the timing (2), bit inversion is performed in transmitting data in the interval C1 or on data in the interval C2. This indicates that the data in the interval C1 intended to be transmitted has a significant number of "0" bits, while the data in the interval A2 and the interval B2 already transmitted has a significant number of "0" bits. Therefore, in a case where it is intended to transmit the interval C2 following the interval B2, if the data in the interval C1 is transmitted with bit inversion, the numbers would be averaged for "1" and "0" bits.

In fact, since the value of the counter 17 is 21h after the interval C2 is transmitted, which is close to 1Fh of the initial value of the counter 17, it is found that DC bias is suppressed.

Although the transmission of data is completed in the interval C1 (the interval C2), in FIG. 4, if there is further transmitted data, the two counters and the exclusive OR gate repeat every 32 bits the counter operation described above and the determination on whether or not the bit is inverted.

For an interval where the transmitted data is bit inverted, the stuff bit inserted immediately before that interval becomes "1". Therefore, the receiver examines the stuff bit, and, if it is "1", inverts 32-bit data to provide the data in the original state. That is, the stuff bit is information indicating whether or not the bit inversion is performed, and allows the receiver to obtain proper data.

The conventional whitener encoder does not invert data in the interval B2, but inverts data in the interval C2. Similarly, the whitener encoder of the present invention does not invert data in the interval B2, but inverts data in the interval C2. Therefore, the number of "1" and "0" is adjusted, so that DC bias can be suppressed in the transmitted data.

Now, an alternate embodiment of the present invention is described by referring to the drawings.

Figure 5:
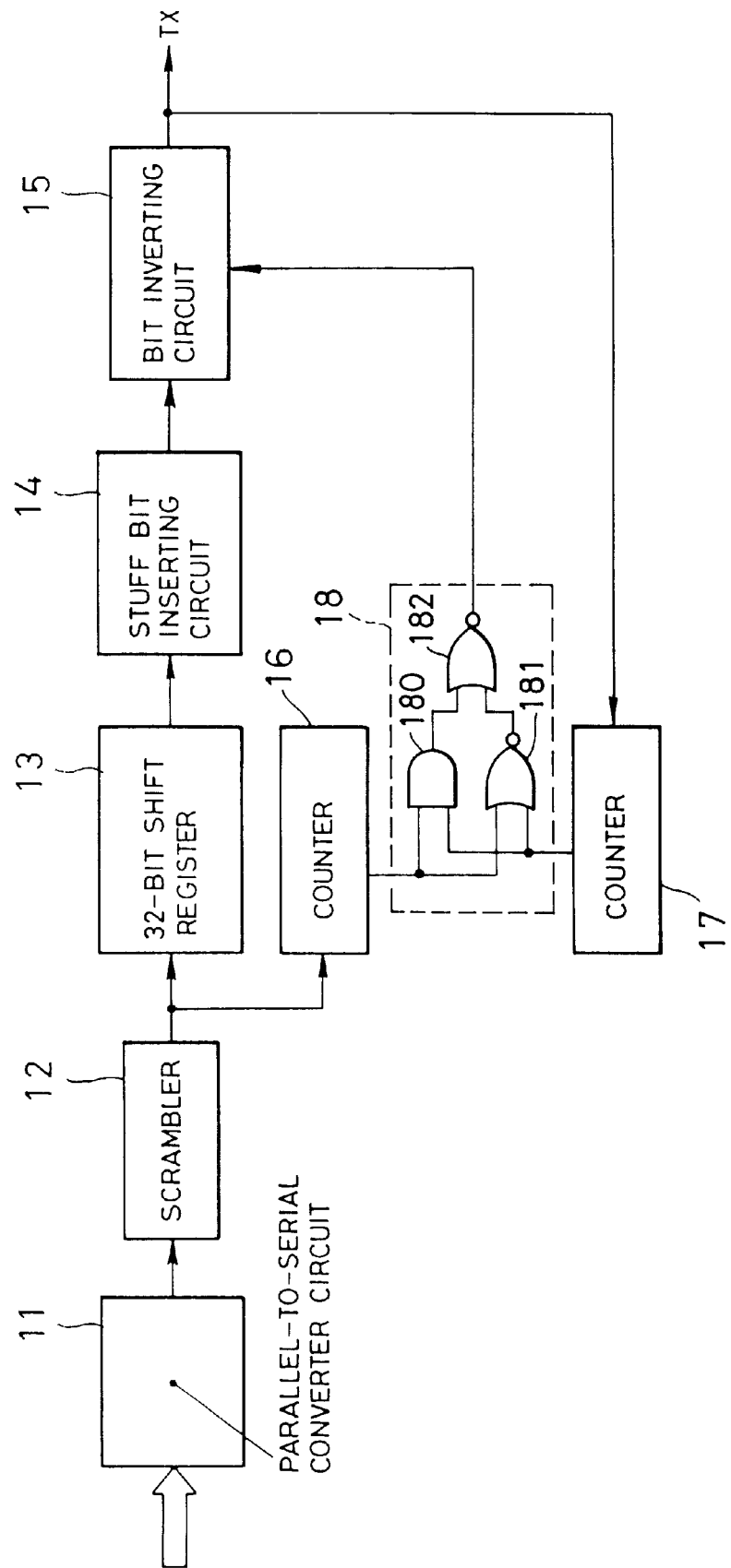
FIG. 5 is a block diagram showing a configuration of a processing unit according to an alternate embodiment of the present invention.

FIG. 5 is a block diagram showing the alternate embodiment of the processing unit of the present invention. While, in FIG. 2, the comparator circuit 18 comprises an exclusive OR gate, in FIG. 5, the comparator circuit 18 comprises two NOR gates 181 and 182, and an AND gate 180.

The comparator circuit 18 of FIG. 5 also outputs "0" when both of the most significant bits of outputs of the two counters 16 and 17 are "0" or "1" (the most significant bits matching each other), and outputs "1" when one of the most significant bits of two counters is "0" and the other is "1" (the most significant bits not matching each other). Therefore, the same result can be obtained as an exclusive OR gate when used in the comparator circuit 18 as in the case of FIG. 2.

Figure 6:
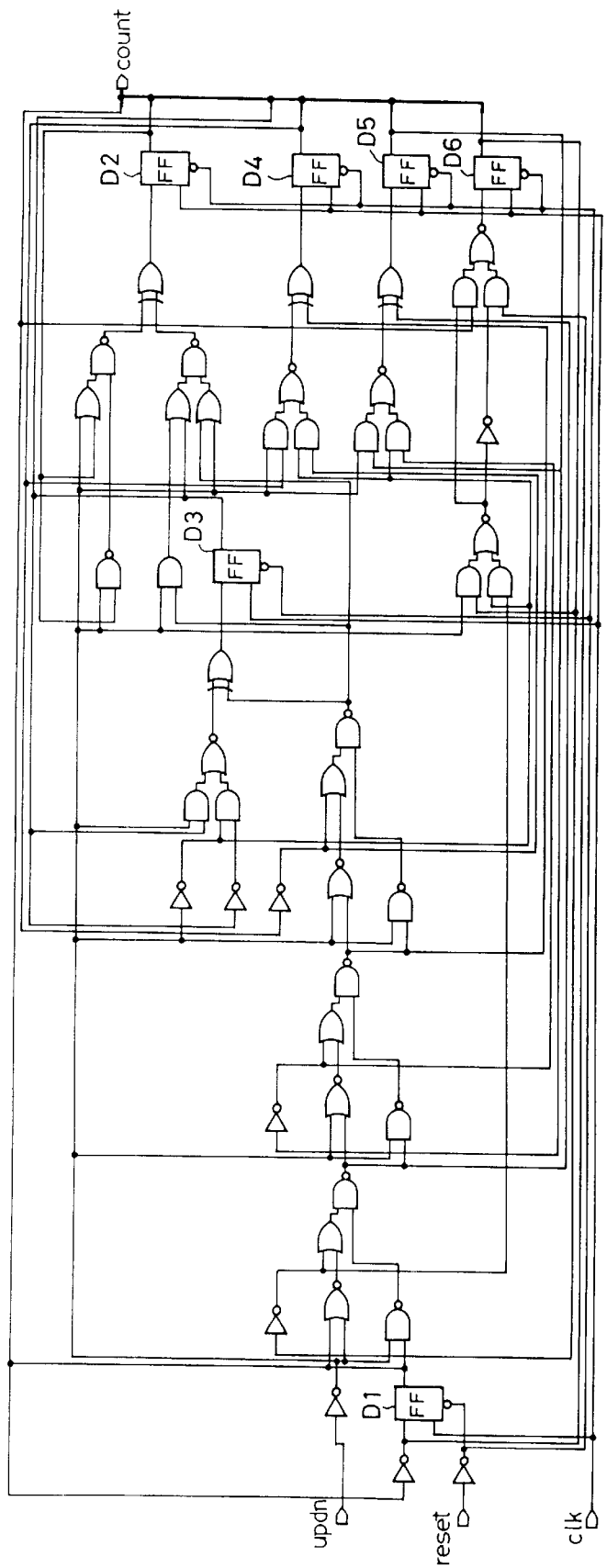
FIG. 6 is a block diagram showing an internal configuration of each counter of FIG. 1, FIG. 2 or FIG. 5.
Figure 7:
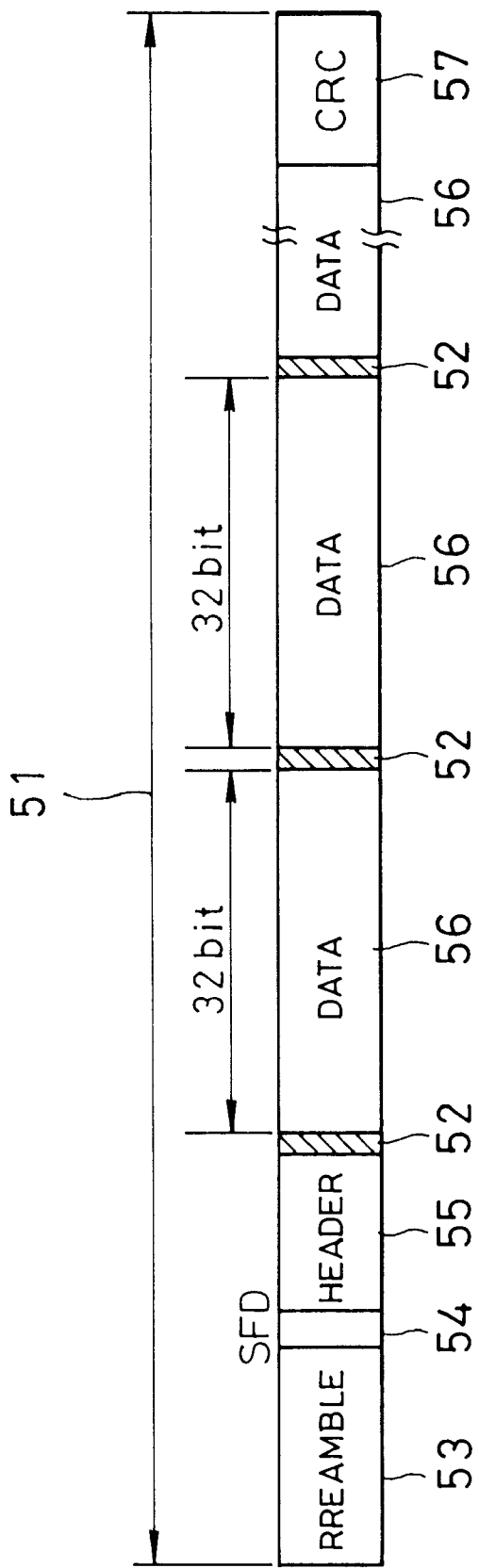
FIG. 7 is a frame format of wireless LAN.

Here, a description is given of a configuration example of each of the counters 16 and 17 in the processing unit. The respective counters 16 and 17 shown in FIGS. 1, 2 and 5 comprise, as shown in FIG. 6, six D-type flip-flop D1–D6 (hereinafter called the "DFF"), and various gates. The counter shown in the figure comprises an up/down counter updn, a clock input terminal clk, a reset terminal reset, and a count output terminal count. Here, the output terminal count is a 6-bit bus type, and is shown by a thick line for convenience.

Such counter holds a count value with six DFFs D1–D6, and performs counting up or down the count value. It is obvious that an equivalent up/down counter can be constituted by utilizing various gates.

The counter shown in FIG. 6 may be constituted by about 66 gates including DFFs. Since the unit uses two such counters, the total number of counters for providing both counters is about 66×2=132. In addition, the comparator circuit 18 of FIG. 2 has one gate, while the comparator circuit 18 of FIG. 5 has three gates.

Then, the scale (number of gates) of each of the above-mentioned processing units is compared to that of the conventional unit. First, the difference between both units is noted. The conventional unit uses two adder circuits, a register, a comparator circuit and the like. On the other hand, the unit of the present invention uses two counters and a comparator circuit. The difference of the configuration should be noticed.

First, the conventional unit has a total of about 330+39+ 34+60=463 gates for the adder circuits 31 and 32, the register 35, and the comparator circuit 33. On the other hand, the unit of the present invention has a total of about 66×2+1=133 gates for the counters 16 and 17, and the comparator circuit 18. Thus, according to the unit of the present invention, it is possible to make a very small circuit.

In summary, whether or not the transmitted data is inverted depends on which of "1" or "0" is in the transmitted data in a 32-bit interval, and which of "1" or "0" is in the transmitted data already transmitted. Thus, without using the result obtained by adding weight to the transmitted data for 32 bits with the first adder circuit as in the conventional unit, equivalent of DC bias suppression can be obtained by using the sign bits of the result of counting up or down the transmitted data every one bit with the first counter as in the unit of the present invention to determine whether values are positive or negative.

As described above, according to the present invention, the section constituted by two adder circuits, a register, a sign inverting circuit, and a comparator circuit is constituted by two counters, an exclusive OR gate and the like in performing the whitener encoder in the processing unit. In this case, since the determination of whether or not the transmitted data is inverted depends on which of "1" or "0" is in the transmitted data in a 32-bit interval, and which of "1" or "0" is in the transmitted data already transmitted, even without using the result obtained by adding weight to the transmitted data for 32 bits with the first adder circuit, an equivalent DC bias suppression can be obtained, as in the conventional unit, by using the sign bits of the result of counting up or down the transmitted data every one bit with the first counter as in the unit of the present invention to determine whether values are positive or negative. Therefore, the unit of the present invention permits simplification of the circuit configuration of the processing unit.

In addition, the conventional unit further adds the result obtained by adding the transmitted data in a 32-bit interval with the first adder circuit to the result obtained in the past with the second adder circuit, thereby holding the result in the register. On the other hand, the unit of the present invention uses the result of counting up or down every one bit the transmitted data already transmitted with the second counter. Accordingly, it is possible to obtain a DC suppression effect equivalent to the prior art, and to simplify the circuit configuration of the conventional unit.

While the description is given for the case of n=32, counting every 32 bits, the number n is not limited to 32. However, if the value of n is too large, the DC bias may not be sufficiently suppressed. On the other hand, if the value of n is small, it is necessary to add many stuff bits or much information for indicating whether or not inversion is performed, resulting in loss of data transfer efficiency.

As described above, the present invention has an advantage that the sign is determined by using the sign bit as the result of counting up or down the transmitted data every one bit with the counter to suppress DC bias, whereby the number of gates constituting the circuit can be reduced, so that the circuit configuration is simplified.

In addition, since the present invention uses the result of counting up or down every one bit the transmitted data already transmitted with the second counter, rather than adding the result obtained by adding the transmitted data in a 32-bit interval with the first adder circuit to the result obtained by adding them in the past with the second adder circuit, thereby holding the result in the register, the present invention has the advantage that the number of gates constituting the circuit can be reduced, resulting in a simplified circuit configuration.

What is claimed is:

1. A processing circuit for monitoring data input sequentially n bits at a time (n being a positive integer), and conditionally inverting and outputting said n-bit data, the processing unit comprising:

first counting means for counting up when the m-th bit (m being any integer from 1 to n) in said n bits is one of "1" or "0," and counting down when it is the other, a second counting means counting up when the k-th bit (k being any integer from 1 to j) in j bits, which are input before said n-bit data is input, is one of "1" or "0," and counting down when it is the other, and bit inverting means for inverting the value of each bit in said n-bit data when the signs of the count values in the first and second counting means match each other.

2. The processing circuit as set forth in claim 1, wherein said bit inverting means comprises a comparator circuit for comparing the signs of the count values in said first and second counting means to each other, and an inverting circuit for inverting the value of each bit in said n-bit data according to the results of comparison by the comparator circuit.

3. The processing circuit as set forth in claim 2, wherein said inverting circuit inverts the value of each bit in said circuit indicates match, and does not invert the value of each bit in said n-bit data when the result of comparison by said comparator circuit indicates no match.

4. The processing circuit as set forth in claim 2, wherein said comparator circuit is an exclusive OR gate that receives sign bits of said first and second counting means as input, and supplies the value of exclusive logical sum of these bit values to said inverting circuit.

5. The processing circuit as set forth in claim 2, wherein said comparator circuit comprises an AND gate that receives sign bits of said first and second counting means as input, and outputs the value of logical product of these bit values, a first NOR gate that receives sign bits of said first and second counting means as input, and outputs an inverted value of logical sum of these count values, and a second NOR gate that receives the output of said AND gate and the output of said first NOR gate as input, wherein the inverted value of the output of said second NOR gate to the inverting circuit is supplied to said inverting circuit.

6. The processing circuit as set forth in claim 1 further comprising means for appending information indicating whether or not inversion is performed by said inverting circuit to the n-bit data, and sending out it.

7. The processing circuit as set forth in claim 1, wherein the sign of said count value is determined by the values of the most significant bits of the count values in said first and second counting values.

8. The processing circuit as set forth in claim 1, wherein the count value in said first counting means is reset by the n bits, the count value in said second counting means being reset by said j bits.

9. The processing circuit as set forth in claim 1, wherein said first and second counting means output n-1 as their count values when they are reset.

10. The processing circuit as set forth in claim 1, wherein said n-bit data represents one or more data groups contained in one frame, said j-bit data containing said data groups from the least significant bit of a header appended to the top of said data groups, and representing data of the number of counted bits.

11. A circuit for providing a balanced output stream of digital data corresponding to an input stream of digital data, comprising:

(a) a first counter coupled to the input stream of digital data and providing a first count signal indicative of a count of "1" bits relative to a count of "0" bits within a subset of the input stream;

(b) a second counter, coupled to the output stream and providing a second count signal indicative of a count of "1" bits relative to a count of "0" bits within the output stream;

(c) a comparator coupled to said first and second count signals and asserting a comparator output signal indicating that said first count signal has a sign equal to a sign of said second count signal; and (d) an inverter that inverts said subset of the input stream in response to said comparator output signal being asserted.

12. A circuit, according to claim 11, wherein said comparator is an XOR gate.

13. A circuit, according to claim 11, wherein said comparator includes an AND gate and a first NOR gate that are coupled to said first and second count signals and includes a second NOR gate coupled to outputs of said AND gate and said first NOR gate.

14. A circuit, according to claim 11, further comprising:

(e) a stuff bit circuit, coupled between the input stream and said inverter to add a bit having a predetermined value to said subset of the input stream.

15. A circuit, according to claim 11, wherein said subset of the input stream contains thirty-two bits.

16. A circuit, according to claim 11, wherein said first counter is reset after receiving said subset of the input stream and said second counter is reset after receiving a number of bits substantially greater than a number of bits in said subset of the input stream.

17. A circuit, according to claim 16, wherein said first and second counters are reset to a value corresponding approximately to a midpoint value of a counting range of said counters.

18. A circuit, according to claim 16, wherein said counters are reset to a value corresponding to one less than a number of bits contained in said subset of the input stream.

19. A method of balancing an output stream of digital data corresponding to an input stream of digital data, comprising:

(a) counting a number of "1" bits relative to a number of "0" bits in a subset of the input stream to provide a first count;

(b) counting a number of "1" bits relative to a number of "0" bits in the output stream to provide a second count; and (c) inverting the subset of the input stream in response to the first count having a sign equal to a sign of the second count.

20. A method according to claim 19, further comprising:

(d) prior to inverting the subset, adding a stuff bit to the subset of the input stream.

* * * * *